July 16, 1968  R. W. CRUGER ET AL  3,392,939
AIRCRAFT ARRESTING SYSTEM
Filed July 5, 1966

INVENTORS
ROBERT W. CRUGER
JOHN S. STRANCE
ARTHUR C. CONDODINA
BY
Meyer, Tilberry & Body United States Patent Office 3,392,939
Patented July 16, 1968

3,392,939
AIRCRAFT ARRESTING SYSTEM
Robert W. Cruger, Springfield, John S. Strance, Drexel Hill, and Arthur C. Condodina, Philadelphia, Pa., assignors to E. W. Bliss Company, Canton, Ohio, a corporation of Delaware
Filed July 5, 1966, Ser. No. 562,601
4 Claims. (Cl. 244—110)

ABSTRACT OF THE DISCLOSURE

The disclosure pertains to aircraft arresting systems in which a textile tape is interposed between a runway pendant adapted to be engaged by an aircraft and an energy absorbing means for braking the aircraft to a stop. In particular the disclosure deals with an improvement in such tape-to-pendant systems which takes into account the fact that the pendant has a much higher modulus of elasticity, but has a yield point which is exceeded before the maximum safe stress capacity of the tape is reached. The combined modulus of the tape-to-pendant system is thus sufficient to satisfy the demand rate for stretch created by an extreme impact load of an aircraft engaging the system.

---

In United States Patent No. Re. 25,406 reissued June 25, 1963, to the assignee in the present invention, an aircraft arresting system is described having among its objects, the improvement of conventional arresting gear in which the aircraft is caught by an all steel cable system. In one type of such conventional gear, it is common to have the cable stretched transversely across the runway, and wound on a cable payout means which, when coupled to a mechanical braking unit, resists payout of the cable in a controlled manner so as to bring the aircraft to a gradual stop.

The main improvement brought about by the invention described in reissue Patent No. 25,406 is to increase the capacity of such all steel arresting gear and permit arrestments at higher engagement speeds. In the improved system, a textile tape woven of high strength synthetic yarn, such as nylon, is interposed between a steel cable pendant, which is engaged by the aircraft when landing, and a rotary tape payout means. The aircraft is caught by the pendant and the tape is paid out at a controlled rate by the rotary tape payout means. The tape is characterized by having a modulus of elasticity much lower than that of the steel pendant. Thus, by introducing a low modulus of elasticity medium into the arresting gear system, it is possible to avoid peak stresses in the system. Otherwise stated, when an aircraft engages the steel cable or pendant, the requirement for payout is satisfied initially by the tape stretch until the payout means can be set into motion. Therefore, by interposing a medium having a low modulus of elasticity between the pendant and the payout means, much higher aircraft engagement speeds are possible.

Ideally, even higher engagement speeds could be obtained with an all-textile system, e.g., a nylon tape and nylon pendant; however, a steel cable pendant has certain advantages over nylon due to its resistance to abrasion and the influences of weather. Moreover a nylon pendant would have to be of considerably larger size than a steel cable of comparable strength making it incompatible with the existing aircraft hook design. Also, interstrand friction tends to weaken synthetic fibers due to the heat generated locally at the impact point.

The present invention retains the successful tape-to-pendant configuration of Patent No. Re. 25,406 permitting higher engagement speeds due to the favorable physical characteristics of the fabric tape and in addition, provides a tape-to-pendant system which permits emergency engagements of distressed aircraft at speeds exceeding those recommended as normal for such systems. By definition herein, a distressed aircraft is one which must engage the arresting system at speeds which initially set up a demand rate for stretch in the pendant alone which exceeds the recommended allowable stress for the particular tape-to-pendant system. That is, the demand for stretch per unit time exceeds the normal response time of the tape-to-pendant system such that excessive stress is placed on the pendant initially, possibly causing it to break or otherwise be seriously weakened.

In accordance with the invention, an aircraft arresting system is provided comprising a tape payout unit, a textile tape woven of high strength yarn adapted to be paid out thereby upon engagement of the system by an aircraft and a cross-runway pendant attached to the tape and engaged by the aircraft while landing having tensile properties at normal arrestment speeds characterized by a high modulus of elasticity comparable to that of a plain steel cable and beyond the distressed aircraft arrestment speed for the system, a lower modulus of elasticity approaching that of the textile tape such that the combined tape-to-pendant elasticity will provide the additional stretch needed to prevent failure at the distressed aircraft speed.

The invention is further particularized in that the pendant is a stainless steel cable having been previously heat treated to provide sufficiently high yield stress of the tape-to-pendant system so that aircraft engaging below 200 knots will not produce stresses beyond the theoretical yield strength of the pendant but for engagement speeds in excess of 200 knots or any other determined speed the yield stress will be exceeded and the pendant will work within the plastic range where the effective modulus is quite low and results in reasonable stresses throughout the system.

It is among the objects of the invention, therefore, to provide a tape-to-pendant aircraft arresting system including a cross-runway pendant having tensile properties providing a built-in, fail-safe link in the system permitting emergency engagements of distressed aircraft at high engagement speeds.

Another object is to provide a pendant which has a stress-strain profile in which theoretical yield strength is matched to the allowable stress of the particular tape-to-pendant system.

Another object is to provide a pendant permitting repeated normal arrestments up to a recommended safe landing speed and thereafter, allowing at least one emergency arrestment at a higher speed.

These and other objects and advantages of the invention will be made apparent by referring to the following description and drawings wherein.

Figure 1:
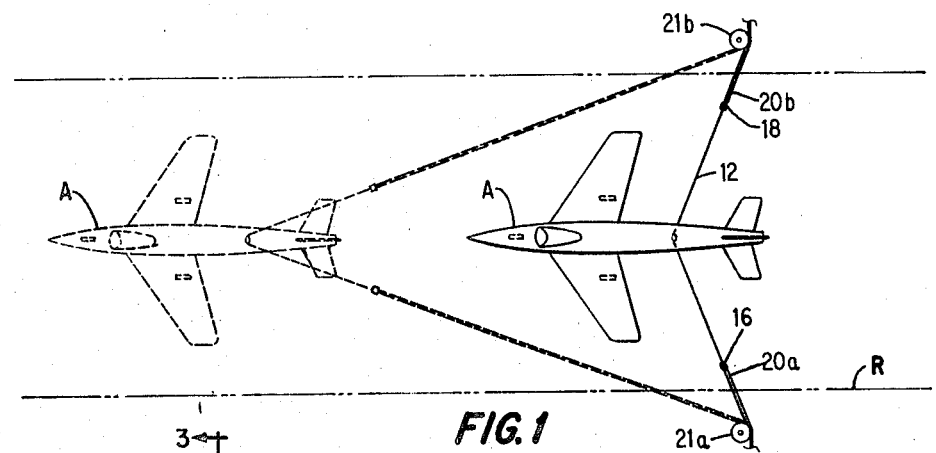
FIGURE 1 is a schematic plan view of an aircraft arresting system showing an aircraft hooking onto a cross runway pendant and being arrested.

Referring now to the drawings wherein the showings are for the purpose of illustrating a preferred embodiment of the invention only and not for the purpose of limiting same, in FIGURE 1 an aircraft A is shown making engagement with a pendant 12 stretched transversely across the runway R. The opposite ends 16, 18 of the pendant 12 are secured to a pair of textile tapes 20a and 20b each of which are adapted to be wound on a reel (not shown) of separate energy absorbers installed on opposite sides of the runway. The tapes will pay out simultaneously from each reel to permit the pendant 12 to move with the aircraft A down the runway as shown in the dotted line position. Sheaves 21a and 21b are secured strategically adjacent the runway R to guide the tapes 20a and 20b. It should be understood that the arrangement described is only one form of tape-to-pendant arresting system which may be employed; for other arrangement and for a thorough discussion thereof reference is made to U.S. Patent No. 3,220,216, issued Nov. 30, 1965 to the assignee of the present invention.

Figure 2:
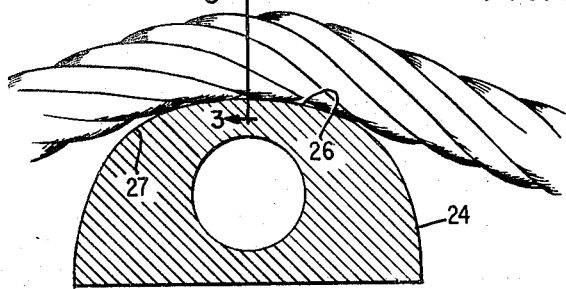
FIGURE 2 is a representative enlargement of the pendant showing the portion thereof which is engaged by the aircraft.
Figure 3:
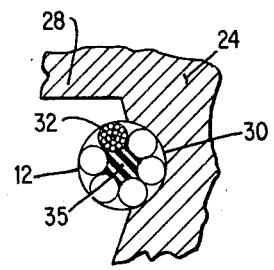
FIGURE 3 is a cross-sectional view taken along line 3—3 of FIGURE 2.

Referring now to FIGURES 2 and 3, the pendant 12 is shown being engaged by a landing hook 24 attached to the underside of the aircraft A. The pendant contacting surface 26 of the hook 24 comprises an arcuate longitudinal convex groove 27 having a constant radius. A shaft 28 is secured to the hook 24 and to the aircraft A so as to maintain groove 27 substantially horizontal prior to cable engagement. The pendant contacting surface 26 has superimposed thereon a transverse concave groove 30 having a radius of curvature such that it will make contact with at least one half of the strands 32 of the pendant 12 at any section of the hook. Thus, if the pendant is a six strand cable as shown, the concave groove 30 will make contact with three strands (FIGURE 3). The strands 32 are helically wound about a core 35 so that each strand makes a 360 degree helical turn about the core for every lay length of the cable. The specific hook design is the subject of U.S. Patent No. 2,979,292, issued Apr. 11, 1961 to the assignee of the present invention and has as its principal objective the provision of an optimum shaped hook in which the cable engaging surface 26 will engage at least ½ of a lay length of the cable with the surface 26 being tangential to the legs of the included angle formed in the cable (FIGURE 2). While the specific hook shape forms no part of the present invention, it is intended that the tape-to-pendant system in accordance with the present invention be used with such a hook to achieve maximum engagement speeds and reduce the tendency toward "notching" of the cable strands. That is, the cable strands 32 in contact with the surface 26 of the hook will be tensioned initially while the remote strands 32 will not and the former will be crushed against the hook by the latter causing sever notching between overlapping wires which are skewed with respect to each other. With the hook 24, however, the cable engages the surface 26 over ½ of its lay length and thus more strands are tensioned directly by the hook thus reducing any tendency to notch.

As aforementioned, an all-nylon, tape-to-pendant system would be ideal from the standpoint of higher engagement speeds, however, the problem of notching and friction makes an all-nylon pendant impractical since synthetic yarns are unable to withstand these factors and retain their strength. Moreover, a nylon pendant would have to be considerably larger than a comparable strength steel cable which raises several problems with the hook design. Therefore, for various reasons, not to mention runway abrasion, the most satisfactory arresting system is a tape-to-steel pendant configuration.

Consider now, irrespective of the energy absorbing system employed, that the engaging velocity limitation is a function of the strength of the pendant used in the system, its modulus of elasticity and speed of sound. Otherwise stated, there is an upper limit to the longitudinal stress which can be applied to a steel cable in excess of which the cable will fail in tension. This upper limit condition can be expressed by the equation $$S=EV/C$$

where S equals the stress in p.s.i.; E is the modulus of elasticity of the cable in p.s.i.; V is the longitudinal velocity component of impact on the cable in f.p.s.; and C is the speed of sound in the cable f.p.s. An accepted modulus of elasticity for plain steel cable is 12 million p.s.i., a C value of 10,000 f.p.s. and an ultimate tensile strength or maximum stress value of 240,000 p.s.i. Substituting these values in the equation, it will be seen that the maximum longitudinal velocity of impact sustainable by a plain steel cable cannot exceed 200 f.p.s. or about 120 knots. The reason for this limitation, although complex, is well understood by those familiar with the dynamic physical properties of steel cable. It will be readily recognized that the pendant 12 stretched across the runway and initially engaged by the aircraft A must either instantaneously accelerate from zero to the speed of the aircraft or fail in tension. There is a finite time before the stress wave front, traveling at the speed of sound, can reach and actuate the payout gear to provide the necessary extra length at the center span demanded by the movement of the aircraft down the runway. Instantaneously upon engagement by the aircraft, the pendant 12 will be strained locally in the vicinity of the hook 24 and subsequently along its length as the longitudinal wave front moves toward the tapes 20a and 20b. Thus the tape-to-pendant configuration must either be susceptible to continuous stretching (strain) at some rate in f.p.s. until the system physically moves to provide the required feed-in or the pendant will fail. Since the modulus of elasticity of the fabric tapes is appreciably lower than that of plain steel cable, the demand rate for stretch per second in the case of a normal arrestment can easily be supplied by the tapes without putting any appreciable stress on the pendant. Thus, the tapes provide substantially all the necessary stretch in the system during a normal arrestment while at the same time transmitting the longitudinal stress wave to the payout gear of the energy absorbing system to place the reels in motion before the maximum stress capacity of the tape itself is exceeded. Thus, referring once again to the equation $$S=EV/C$$

and assuming that the tapes are each woven of high strength nylon yarn having a miximum stress capacity of 50,000 p.s.i., a modulus of elasticity of 300,000 p.s.i. and a longitudinal stress wave speed of 5,000 f.p.s., the maximum allowable longitudinal impact velocity is increased from 200 f.p.s. for plain steel cable to approximately 833 f.p.s. or about 500 knots for the tape. It is clear therefore from this cursory, theoretical analysis that an appreciable increase in engagement speeds is obtainable in practice, though for various mechanical reasons of safe operation, not of the magnitude indicated and, in fact, arrestments are routine with a tape-to-pendant configuration at speeds in the order of 190 knots.

Figure 4:
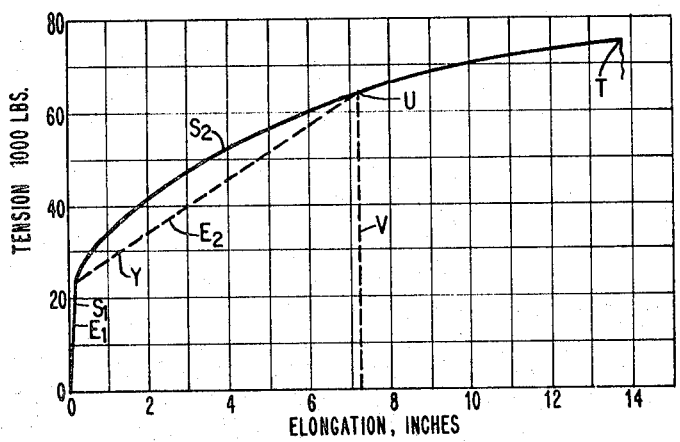
FIGURE 4 is a representative load-elongation curve for a pendant as provided by the invention.

The present invention extends the practical engaging speed limits of tape-to-pendant systems from the present level to well over 200 knots, the maximum foreseeable for present day aircraft. In accordance with the invention, where the engaging speed must exceed that recommended for normal operation, such as occurs with certain emergency arrestments, it has been discovered that if the pendant 12 is fabricated from properly annealed stainless steel wire, improved mechanical properties and consequent higher engagement speeds are achieved. Referring to FIGURE 4, a load-elongation curve for 1¼" diameter stainless steel cable having a gauge length of 24.03 inches is shown. The portion S1 of the curve has a slope corresponding to the modulus of elasticity during the elastic range of the cable and the portion S2 during the plastic range up to the maximum strength U developed at 30 percent elongation V; the yield strength is Y and the ultimate strength T. The stainless steel cable, as provided by the invention, displays the property of an extremely low modulus of elasticity after it reaches its yield strength Y, that is, in the plastic portion S2 of the curve in FIGURE 4, the average slope E2 corresponds to a modulus of elasticity of less than 2 million p.s.i. This compares with a modulus of elasticity of 500,000 p.s.i. for nylon, but nevertheless represents an appreciable increase in stretchability over tape-to-pendant systems where the pendant is a plain steel cable. At normal landing speeds of say up to 200 knots, the pendant 12 can be made to behave in a fashion similar to standard plain steel cable by proper manipulation in the heat transfer process. However, at the point where operation with standard cable approaches critical imact values, the stainless steel cable will reach its yield point Y which immediately lowers the modulus of elasticity to a range approaching that of the textile tape itself, thus precluding impact tensions from becoming critical and providing an emergency capability to accept the higher distressed aircraft engaging speed. Moreover, since the stainless steel cable has a modulus of elasticity in the elastic region approaching that of a standard steel cable, it lends itself readily to interchangeability and direct substitution in existing arresting systems. The reusability of the stainless steel cable after an emergency arrestment depends on the circumstances. Normally for safe operating procedures the cable should be replaced after an emergency arrestment.

As a specific example of a stainless steel cable suitable for use in accordance with the invention, but by no means intended to limit the same, the American Chain and Cable Company, Inc., Wilkes-Barre, Pa., makes available a suitable cable identified as 6 x 25 IWSC energy absorbing cable having a yield strength of about 28,880 p.s.i., a maximum strength of 81,140 p.s.i. at 30 percent elongation and an ultimate strength of 93,160 p.s.i.

Other arrangements and modifications will occur to those skilled in the art upon reading the specification and attached claims, and examining the included drawings, said other arrangements and modifications being intended to be included in the invention as defined in the appended claims.

Having thus described our invention, we claim:

1. An aircraft arresting system comprising, in combination, a runway pendant adapted to be engaged by an aircraft and having a high modulus of elasticity,
   an energy absorbing device having tape payout means coupled thereto,
   a textile tape woven of synthetic fibers connecting the pendant to said energy absorbing device and having a low modulus of elasticity relative to that of the pendant,
   said synthetic fibers including continuous, unbroken, load transferring strands running from end to end in said tape adapted to transmit the arresting load from the pendant to the energy absorbing device and to thereby accelerate the tape pay out means from a condition of rest upon impact of an aircraft with said pendant, the demand rate per second for stretch being supplied almost entirely by elongation of said load transferring strands during the initial acceleration period, and
   said pendant having a yield point which is exceeded before the maximum safe stress capacity is reached for said strands and thereafter the modulus of elasticity being reduced thereby providing, in combination with the modulus of said strands, an overall tape-to-pendant modulus sufficient to satisfy the demand rate for stretch in the system at impact loads normally exceeding the maximum safe stress capacity of the tape alone.

2. An aircraft arresting system according to claim 1 wherein the maximum safe stress capacity of the load transferring strands is in the order of 50,000 p.s.i.

3. An aircraft arresting system according to claim 1 wherein the combined tape-to-pendant modulus of elasticity is greater than that of the tape alone and less than that of the pendant after exceeding its yield point.

4. An aircraft arresting system according to claim 3 wherein the combined tape-to-pendant modulus of elasticity is between 0.3 and 2 million p.s.i.

References Cited

UNITED STATES PATENTS

| | | | |
|---|---|---|---|
| Re. 25,406 | 6/1963 | Byrne et al. | 244—110 |
| 3,217,838 | 11/1965 | Peterson et al. | 244—110 XR |

MILTON BUCHLER, *Primary Examiner.*

F. S. MIDDLETON, *Examiner.*

P. E. SAUBERER, *Assistant Examiner.*